United States Patent Office 3,478,030
Patented Nov. 11, 1969

3,478,030
BENZAMIDE SUBSTITUTED ANILINO AMINOPYRIMIDINES
James Harold Short, Lake Forest, Ill., assignor to Abbott Laboratories, North Chicago, Ill., a corporation of Illinois
No Drawing. Filed June 27, 1966, Ser. No. 560,830
Int. Cl. C07d 51/42, 51/44; A61k 27/00
U.S. Cl. 260—256.4          3 Claims

ABSTRACT OF THE DISCLOSURE

Benzamide substituted anilino aminopyrimidines useful to increase the coronary blood flow in warm-blooded animals.

---

This invention is directed to novel chemical compounds, and more particularly, to substituted pyrimidines having the general formula

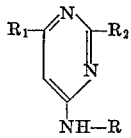

and acid-addition salts thereof. In this formula, R represents

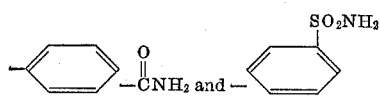

$R_1$ and $R_2$ are each hydrogen and amino. Although both $R_1$ and $R_2$ may be hydrogen and amino, they are never identical. That is to say, when $R_1$ is hydrogen, $R_2$ is amino, and when $R_1$ is amino, $R_2$ is hydrogen.

The non-toxic compounds of this invention exhibit valuable pharmacological therapeutic effects. It has been found that these compounds are potent dilators of coronary arteries. For example, when the free bases or their non-toxic acid-addition salts of this invention are dissolved in saline or suspended in a 50% aqueous propylene glycol solution, and administered intravenously to warm-blooded animals in a dosage of from 10 to 150 mg./kg. of body weight, there is a marked increase in the flow of coronary blood. Coronary blood flow may be increased by as much as 25% within the first hour, and by even greater percentages within the next few hours after administration. Other acid-addition salts of this series are useful as intermediates in making the non-toxic salts or the free bases, which have the aforementioned utility.

In general, the novel compounds of this invention are prepared by reacting the appropriately substituted chloropyrimidine with an equimolar proportion of sulfanilamide or the benzamide. The reactants are dissolved in a suitable solvent such as water or alcohol, and refluxed with heating for one to ten hours. Generally, the reaction is complete within one to two hours, but continuing the refluxing results in maximum yields. The temperature may be maintained at from room temperature to reflux temperature, depending upon the reaction rate desired. After refluxing, the solution is cooled thereby forming a precipitate, filtered, recrystallized from an appropriate hydroxylic solvent such as water or alcohol, and dried. In this manner, the acid-addition salts are formed, which may then be converted to the free bases.

Since the free base is insoluble in water, it may be desired to have the reaction proceed directly to the acid-addition salt by adding small amounts of concentrated acid to the reaction mixture. The acid-addition salt may be converted to the free base by dissolving the salt in an acid or neutral solution and raising the pH to an alkaline level until the free base precipitates from the solution.

In the examples following herein, the reactions described generally relate to the preparation of the acid-addition salts, and more specifically, to the hydrochloride salts. However, it is to be understood that the free bases are prepared according to the same general reaction scheme, as is understood by those skilled in the art. The following examples serve to illustrate various specific embodiments of this invention and are in no way designed to limit the invention.

EXAMPLE 1 p-[N-(6-amino-4-pyrimidinylamino)]-benzamide hydrochloride

To 200 ml. of water containing 8.3 ml. of concentrated hydrochloric acid is added 13.6 grams of para aminobenzamide and 12.9 grams of 4-amino-6-chloropyrimidine. The mixture is heated under reflux for 4 hours. The solution is then cooled and the white solid precipitate forms. The precipitate is filtered, recrystallized from water and dried, yielding p-[(6-amino-4-pyrimidinylamino)]-benzamide hydrochloride having a melting point of 178°–179° C. Analysis calculated: C=49.72%; H=4.55%; N=26.36% Found: C=49.29%; H=4.38%; N=26.17%.

EXAMPLE 2

3-(2-amino-4-pyrimidinylamino)-benzenesulfonamide hydrochloride

To 100 ml. of water containing 3 ml. concentrated hydrochloric acid is added 0.05 mole of 2-amino-4-chloropyrimidine and 0.05 mole of m-aminobenzenesulfonamide, and the mixture is heated on a steam bath for 2 hours. Upon cooling, a white precipitate forms. The precipitate is filtered, recrystallized from boiling water and dried, yielding 3-(2-amino-4-pyrimidinylamino)-benzenesulfonamide hydrochloride having a melting point of 271°–274° C. Analysis calculated: C=39.80%; H=4.01%; N=23.21%. Found: C=39.72%; H=3.71%; N=23.17%.

EXAMPLE 3

4-(2-amino-4-pyrimidinylamino)-benzamide hydrochloride

The procedure of Example 2 is as followed except that 0.05 mole of 2-amino-4-chloropyrimidine is added to 0.05 mole of paraaminobenzamide in 100 ml. of water. Recrystallization from boiling water yields 4-(2-amino-4-pyrimidinylamino)-benzamide hydrochloride having a melting point of 280°–282° C. Analysis calculated: C=49.72%; H=4.55%; N=26.36%. Found: C=49.95%; H=5.03%; N=26.56%.

I claim:
1. A compound comprising a member selected from the group consisting of a free base of the formula

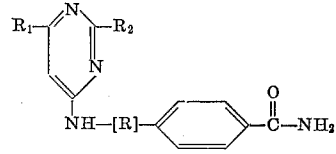

wherein $R_1$ is hydrogen when $R_2$ is amino and $R_1$ is amino when $R_2$ is hydrogen, and the pharmaceutically acceptable acid addition salts thereof.

2. A compound according to claim 1 wherein $R_1$ is hydrogen and $R_2$ is amino.

3. A compound according to claim 1 wherein $R_1$ is amino and $R_2$ is hydrogen.

References Cited

UNITED STATES PATENTS 3,126,382  3/1964  Staeuble _____ 260—256.4

FOREIGN PATENTS 3,539     9/1965  France.
795,174   5/1958  Great Britain.

ALEX MAZEL, Primary Examiner
R. J. GALLAGHER, Assistant Examiner

U.S. Cl. X.R.

260—256.5; 424—251